UNITED STATES PATENT OFFICE.

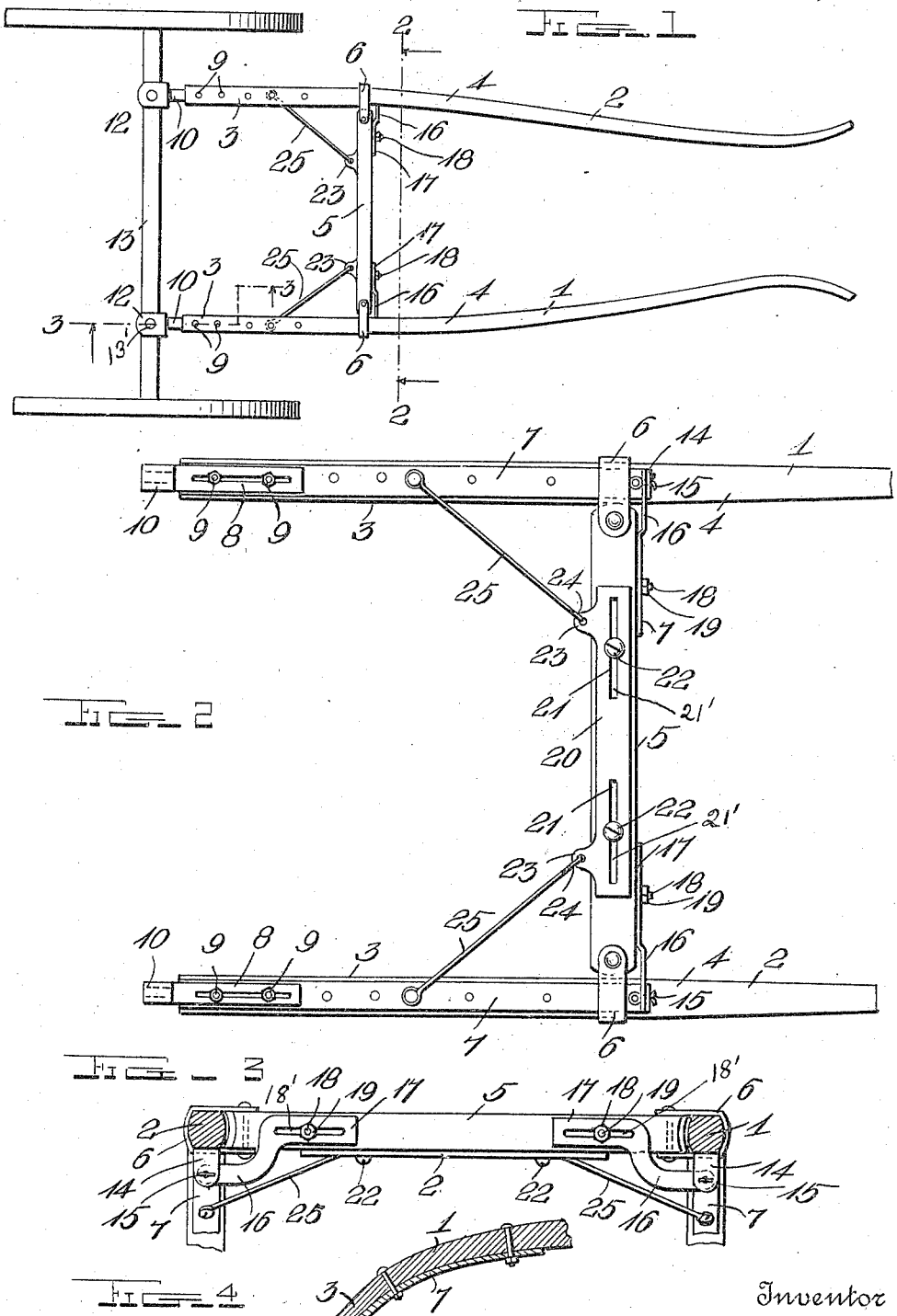

WARREN A. KITCHEN, OF NEW MARKET, IOWA.

SHIFTING SHAFTS FOR VEHICLES.

947,824. Specification of Letters Patent. Patented Feb. 1, 1910.

Application filed February 25, 1909. Serial No. 479,981.

*To all whom it may concern:*

Be it known that I, WARREN A. KITCHEN, a citizen of the United States, residing at New Market, in the county of Taylor and State of Iowa, have invented certain new and useful Improvements in Shifting Shafts for Vehicles; and I do declare the following to be a full, clear, and exact description of the invention, such as will enable others skilled in the art to which it appertains to make and use the same.

This invention relates to shifting shafts for vehicles and has for its object to provide a shaft construction whereby the shafts may be shifted laterally to either side without turning the front wheels or front axle so that the draft animal may work at either side of the center line of draft and thus avoid irregularities or obstructions when passing over rough and irregular roads.

With this and other objects in view the invention consists of certain novel features of construction combination and arrangement of parts, as will be more fully described and particularly pointed out in the appended claims.

In the accompanying drawings, Figure 1 is a plan view showing the shafts connected with the front axle of a vehicle, Fig. 2 is a bottom plan view of the shaft construction, Fig. 3, is a transverse section taken on line 2—2 of Fig. 1, Fig. 4, is a longitudinal section taken through the rear of one of the shafts and the means for attaching it to the vehicle axle on the line 3—3 of Fig. 1.

Referring to the drawings for a more particular description of the invention the numerals 1 and 2 indicate the right and left thills which comprise the shafts and which are provided with downwardly curved rear ends 3, as usual, and are connected at the rear ends of their straight portions 4 by a cross bar 5 provided at opposite ends with pivoted clips 6 which freely receive the shaft members. The end surfaces of the rear curved portions of the shaft members are provided with metal reinforcing strips 7 and the extreme rear end of each of the shaft members is provided with a longitudinally adjustable plate 8 which is connected thereto by bolts 9. The extreme rear ends of the plates 8 are provided with looped portions 10 which receive the connecting pins 11 the rear ends of which have a swiveled connection with clips 12 which receive the front axle 13 of the vehicle and are pivoted thereto by bolts, 13′. The extreme forward ends of the reinforcing strips 7 are provided with downwardly bent terminals 14 which are connected preferably by cotter pins 15 with the outer ends of the arms 16 of sliding plate members 17 which are adjustably mounted upon the front side edge of the cross bar 5 by bolts 18 extending through the slotted portions 18′ of said plate members. These bolts are held in position by nuts 19 screwing on the threaded ends thereof.

I will now describe the means for effecting radial or rotary movement of the shafts as well as lateral movement when shifted to either side of the center line of draft.

A transverse bar 20 provided at opposite ends with longitudinal slots 21 is slidably mounted upon the bottom face of the crosspiece or bar 5 by bolts 22 extending through the slotted portions 21′ of said bar and through the cross piece. Said bar is also provided at its rear side edge and near opposite ends with off set portions 23 which receive the hooked portions as 24, of obliquely disposed connecting links 25 connected at their rear ends with the rear curved portions of the thills or shaft members.

From the foregoing description it will be readily observed that the draft animal may work at either the right or left side of the center line of draft and when shifting from one position to another the shafts will move together and will be properly guided in their lateral movement by the sliding plate members 17 which slide upon bolts, 18 and that the shafts will be also rotated or turned readily by means of the sliding bar 20 and links 25 to the proper extent.

From the foregoing description taken in connection with the accompanying drawings, the construction and operation of the invention will be readily understood without requiring a more extended explanation.

Various changes in the form, proportion and minor details of construction may be resorted to without departing from the principle or sacrificing any of the advantages of this invention as defined in the appended claims.

What I claim as my invention is:

1. In a device of the class described a pair of shaft members, a cross bar between the same, clips pivoted to the opposite ends of the cross bar to freely receive the shaft members, guide plates slidably connected with the cross bar and the shaft members, a sliding bar mounted upon the crosspiece, and obliquely disposed links between the ends of said sliding bar and the rear portions of the shaft members.

2. In a device of the class described a pair of shaft members, a cross-piece there-between, clips pivoted to opposite ends of the cross-piece and freely receiving the shaft members, slotted plate members slidably mounted upon the front side edge of the cross-piece and provided with longitudinal arms, connected with the shaft members, a sliding bar of less length than the cross piece mounted under the same and provided near opposite ends with off sets, and obliquely disposed links between the off sets of said bar and the rear portions of the shaft members.

3. In a device of the class described, shaft members, having downwardly curved rear portions, metal reinforcing strips secured to the under surfaces of the rear portions of the shaft members and provided with downwardly bent terminals at their forward ends, a cross piece between the shaft members, clips pivoted to opposite ends of the cross-piece and freely receiving the shaft members, and plate members slidably mounted upon the front side of the cross piece and provided with longitudinal arms with means for connecting the arms of the plate members with the downwardly bent terminals of the reinforcing strips.

4. In a device of the class described, a pair of laterally adjustable shaft members, a cross bar between the same, clips pivoted to the opposite ends of the cross bar to freely receive the shaft members, and means for guiding the shaft members when shifted from one position to another and for rotating the same in said clips.

In testimony whereof I have hereunto set my hand in presence of two subscribing witnesses.

WARREN A. KITCHEN.

Witnesses:
O. E. Dougherty,
E. C. Ross.